United States Patent
Beyerlein

(10) Patent No.: US 9,470,296 B1
(45) Date of Patent: Oct. 18, 2016

(54) ANTI-LASH ASSEMBLY FOR VEHICLE POWER STEERING

(71) Applicant: TRW Automotive U.S. LLC, Livonia, MI (US)

(72) Inventor: Jeffrey Beyerlein, Washington, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/689,505

(22) Filed: Apr. 17, 2015

(51) Int. Cl.
  *B62D 5/04* (2006.01)
  *F16H 25/22* (2006.01)
  *B62D 5/20* (2006.01)

(52) U.S. Cl.
  CPC ......... *F16H 25/2209* (2013.01); *B62D 5/0421* (2013.01); *B62D 5/0448* (2013.01); *B62D 5/20* (2013.01)

(58) Field of Classification Search
  CPC .......................... B62D 5/0445; B62D 5/0448
  See application file for complete search history.

(56) References Cited

U.S. PATENT DOCUMENTS

| | | | |
|---|---|---|---|
| 4,754,829 A | 7/1988 | Shimizu | |
| 4,825,972 A | 5/1989 | Shimizu | |
| 4,837,692 A | 6/1989 | Shimizu | |
| 5,083,626 A | 1/1992 | Abe et al. | |
| 5,988,311 A | 11/1999 | Kuribayashi et al. | |
| 6,082,483 A | 7/2000 | Taniguchi et al. | |
| 6,123,167 A | 9/2000 | Miller et al. | |
| 6,378,646 B1 | 4/2002 | Bugosh | |
| 6,427,799 B1 | 8/2002 | Kodaira | |
| 6,454,044 B1 | 9/2002 | Menjak et al. | |
| 6,938,723 B2 | 9/2005 | Tatewaki et al. | |
| 7,628,088 B2 | 12/2009 | Osterlanger et al. | |
| 2003/0019686 A1 | 1/2003 | Fukuda et al. | |
| 2015/0329138 A1* | 11/2015 | Peterreins | B62D 5/0448 74/424.75 |

* cited by examiner

*Primary Examiner* — Kevin Hurley
(74) *Attorney, Agent, or Firm* — MacMillan, Sobanski & Todd, LLC

(57) ABSTRACT

A vehicle power steering assembly comprises a steering member having a screw portion. The screw portion has an external screw thread convolution with a first lead spacing. A ball nut is operatively connected to the screw portion. A bushing is operatively connected to the screw portion. The bushing has a bushing screw thread convolution with a second lead spacing. The second lead spacing is different than the first lead spacing. The bushing biases the ball nut against the screw portion.

12 Claims, 6 Drawing Sheets

ANTI-LASH ASSEMBLY FOR VEHICLE POWER STEERING

BACKGROUND OF INVENTION

This invention relates in general to vehicle power steering assemblies and in particular to an anti-lash assembly for use in such a vehicle power steering assembly.

One known power steering assembly for turning steerable wheels of a vehicle includes a ball nut for transmitting force between an axially movable rack member and a power source. For example, the power source may be an electric motor or hydraulic system. Upon actuation of the power source, the ball nut is driven to rotate relative to the rack member and the rotational force of the ball nut is transmitted to the rack member by balls that drive the rack member axially. The axial movement of the rack member by the balls effects turning movement of the steerable wheels.

Turning movement of the steerable wheels is controlled by a driver rotating a steering wheel. Rotating the steering wheel activates the power source. When rotation of the steering wheel is reversed, both the rotational force of the ball nut and a direction of travel for the rack member are reversed. Reversing the direction of travel for the rack member may result in "lash" in the power steering assembly. For example, the lash may occur when a direction of motion for the power steering assembly is reversed and clearances between components of the power steering assembly are taken up before the reversal of motion is complete. Depending upon the amount of any such lash, the lash may be detectable by the driver as a rattle or other similar noise.

Thus, it would be desirable to have a power steering assembly which reduces the lash between the ball nut and the rack member in the vehicle power steering assembly.

SUMMARY OF INVENTION

This invention relates to an anti-lash assembly for use in a vehicle power steering assembly.

According to one embodiment, a vehicle power steering assembly may comprise, individually and/or in combination, one or more of the following features: a steering member having a screw portion, a ball nut operatively connected to the screw portion, and a bushing operatively connected to the screw portion. The screw portion has an external screw thread convolution with a first lead spacing. The bushing has a bushing screw thread convolution with a second lead spacing. The second lead spacing is different than the first lead spacing. The bushing biases the ball nut against the screw portion.

According to another embodiment, a vehicle power steering assembly may comprise, individually and/or in combination, one or more of the following features: a steering member, a ball nut assembly, a bearing assembly, a power source, and a bushing. The steering member is disposed in a rack housing, includes a rack portion operatively connected to a vehicle steering wheel, and also has a screw portion. The ball nut assembly is operatively connected to the screw portion for effecting axial movement of the steering member upon rotation of the vehicle steering wheel. The bearing assembly is carried by the rotor shaft for rotatably supporting the ball nut assembly relative to the steering member. The power source is operatively connected to the rotor shaft by a pulley assembly. The bushing is operatively connected to the screw portion and biases the ball nut assembly against the screw portion.

According to another embodiment, a method of biasing a vehicle power steering assembly may comprise, individually and/or in combination, one or more of the following features: operatively connecting a ball nut to a screw portion of a steering member, operatively connecting a bushing to the screw portion, and tightening the bushing against the ball nut to bias the ball nut against the screw portion. The screw portion has an external screw thread convolution with a first lead spacing. The bushing has a bushing screw thread convolution with a second lead spacing different than the first lead spacing.

An advantage of an embodiment is reduction of lash in the vehicle power steering assembly.

DETAILED DESCRIPTION OF THE PREFERRED EMBODIMENT

Figure 1:
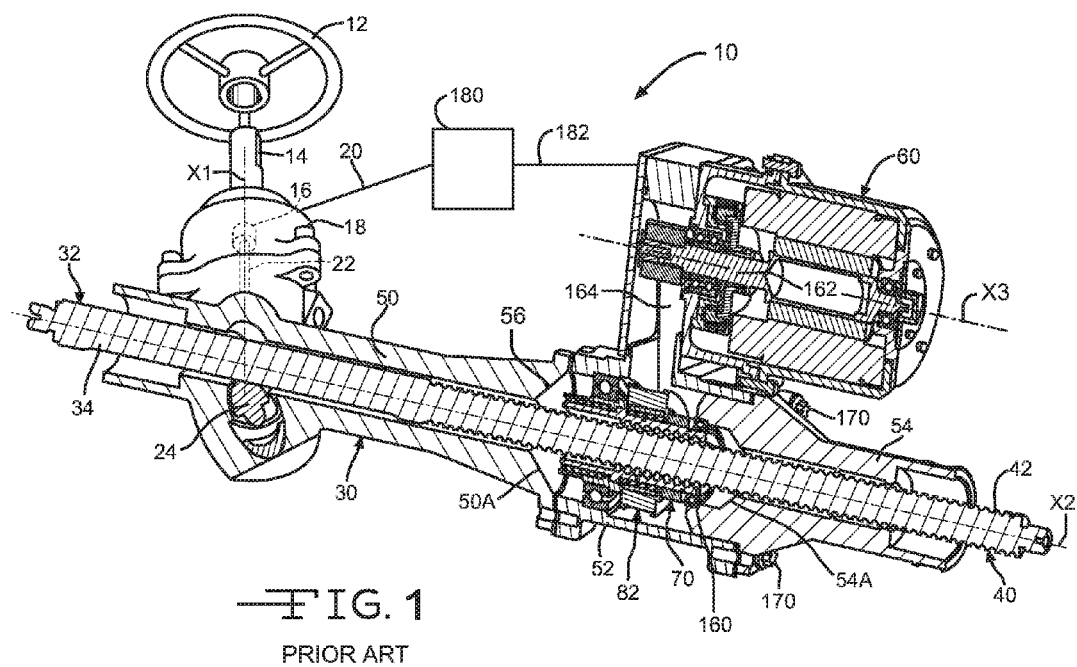
FIG. 1 is a partial sectional view of a prior art vehicle power steering assembly.
Figure 2:
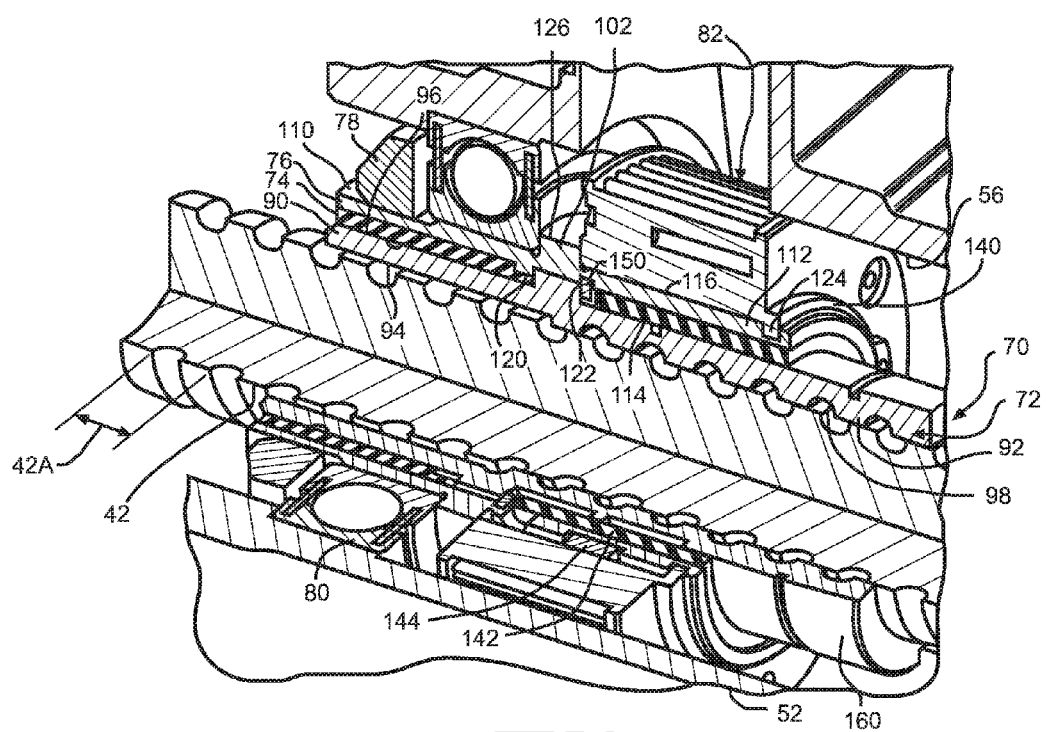
FIG. 2 is a view of a portion of the prior art vehicle power steering assembly illustrated in FIG. 1.

Referring now to FIGS. 1 and 2, there is illustrated a portion of a prior art vehicle power steering assembly, indicated generally at 10. The general structure and operation of the vehicle power steering assembly 10 is conventional in the art. Thus, only those portions of the vehicle power steering assembly 10 which are necessary for a full understanding of this invention will be explained and illustrated in detail. As illustrated, the vehicle power steering assembly 10 is an electric power steering assembly comprising a vehicle electric belt driven rack drive steering assembly and is associated with the front driven wheels (not shown) of the vehicle. Also, although this invention will be described and illustrated in connection with the particular vehicle power steering assembly 10 disclosed herein, it will be appreciated that this invention may be used in connection with other vehicle power steering assemblies, including other electric, hydraulic, or otherwise powered power steering assemblies known to those skilled in the art.

The illustrated vehicle power steering assembly 10 includes a vehicle steering wheel 12 and a rotatable input shaft 14 which is operatively coupled in a manner not shown, to the steering wheel 12 for rotation therewith about a steering axis X1. A torque sensor 16 is located inside a pinion housing 18 and encircles the input shaft 14. The torque sensor 16 includes coils (not shown) which respond to rotation of the input shaft 14 and which generate an electrical signal over electrical lines 20 indicative of the direction and magnitude of applied steering torque.

A torsion bar 22 is provided to connect the input shaft 14 to a pinion 24 located inside the pinion housing 18. The torsion bar 22 twists in response to the steering torque applied to the steering wheel 12. When the torsion bar 22 twists, relative rotation occurs between the input shaft 14 and the pinion 24.

The pinion housing 18 is attached to a rack housing, indicated generally at 30. A linearly movable steering member 32 extends axially through the rack housing 30. The steering member 32 is linearly (or axially) movable along a rack axis X2. A rack portion 34 of the steering member 32 is provided with a series of rack teeth (not shown) which meshingly engage gear teeth (not shown) provided on the pinion 24. The steering member 32 further includes a screw portion 40 having an external screw thread convolution 42. The external screw thread convolution 42 has a first lead spacing 42A (best shown in FIG. 2)—i.e., a distance along the rack axis X2 covered by one complete rotation of the external screw thread convolution 42. The steering member 32 is connected with steerable wheels (not shown) of the vehicle through tie rods (not shown) located at the distal ends of the steering member 32. Linear movement of the steering member 32 along the rack axis X2 results in steering movement of the steerable wheels in a known manner.

The rack housing 30 has a generally cylindrical configuration and includes a first section 50, a second section 52 and a third section 54. The first section 50 is connected to the second section 52 by suitable means, such as for example by a plurality of bolts and nuts (not shown). Similarly, the second section 52 is connected to the third section 54 by suitable means, such as for example by a plurality of bolts and nuts (only the bolts shown in FIG. 1 by reference number 170). The first section 50 is provided with a radially enlarged end 50A, and the third section 54 is provided with a radially enlarged end 54A. The enlarged ends 50A and 54A of the respective first and third sections 50 and 54, respectively, cooperate with the second section 52 to define an annular chamber 56. Alternatively, as known to those skilled in the art, the structure of the rack housing 30 can be other than illustrated. For example, the rack housing 30 can include less than three sections or more than three sections if so desired.

The power steering assembly 10 further includes a power source 60, illustrated as an electric motor, which is drivably connected to a ball nut assembly, indicated generally at 70. Alternatively, as known to those skilled in the art, the power source 60 may be other than the electric motor. For example, the power source 60 may be a hydraulic system. The ball nut assembly 70 effects axial movement of the steering member 32 upon rotation of the steering wheel 12. In the event of the inability of the power source 60 to effect axial movement of the steering member 32, the mechanical connection between the gear teeth on the pinion 24 and the rack teeth on the rack portion 34 of the steering member 32 permits manual steering of the vehicle. The ball nut assembly 70 is located in the chamber 56 of the rack housing 30 and encircles the screw portion 40 of the steering member 32. As best shown in FIG. 2, the ball nut assembly 70 includes a ball nut 72, an insulator 74, and a rotor shaft 76. As will be discussed below, the ball nut 72 is fixed to the rotor shaft 76 for rotation therewith.

The ball nut 72 has oppositely disposed first and second end portions 90 and 92, respectively, and generally cylindrical inner and outer surfaces 94 and 96, respectively, extending between the first and second end portions 90 and 92, respectively. The first end portion 90 of the ball nut 72 projects axially toward the end 50A of the first section 50 of the rack housing 30. The second end portion 92 of the ball nut 72 projects toward the end 54A of the third section 54 of the rack housing 30. The second end portion 92 is provided with a screw thread convolution 98 formed on the cylindrical inner surface 94 thereof. The ball nut 72 further includes a raised shoulder or flange 102 provided on the cylindrical outer surface 96 thereof.

The rotor shaft 76 has oppositely disposed first and second end portions 110 and 112, respectively, and generally cylindrical inner and outer surfaces 114 and 116, respectively, extending between the end portions. The first end portion 110 of the rotor shaft 76 projects axially toward the end 50A of the first section 50 of the rack housing 30 and is supported by a bearing assembly 80. For the vehicle power steering system 10, the bearing assembly 80 is a ball bearing or a journal bearing. The first end portion 110 further includes a raised shoulder 120 provided on the inner cylindrical surface 114 thereof. The second end portion 112 of the rotor shaft 76 projects toward the end 54A of the third section 54 of the rack housing 30. The second end portion 112 is provided with a first annular groove or recess 122 formed in the cylindrical inner surface 114 thereof, and with a second annular groove 124 formed in the cylindrical outer surface 116 thereof.

The bearing assembly 80 is disposed on the cylindrical outer surface 116 of the first end portion 110 of the rotor shaft 76. To accomplish this, a spanner nut 78 screws onto threads (not shown) provided in the cylindrical outer surface 116 in the first end portion 110 of the rotor shaft 76. As the spanner nut 78 is tightened against the adjacent surface of the bearing assembly 80, the opposite surface of the bearing assembly 80 engages the associated surface of a shoulder 126 of the rotor shaft 76 and secures the bearing assembly 80. As will be discussed below, the bearing assembly 80 is operative to rotatably support the ball nut 72 relative to the steering member 32. Alternatively, other methods can be used to retain the bearing assembly 80 on the rotor shaft 76 and/or to rotatably support the ball nut 72 relative to the steering member 32. For the vehicle power steering system 10, the bearing assembly 80 is a ball bearing. Alternatively, other types of bearing assemblies can be used if so desired.

The vehicle power steering assembly 10 further includes a pulley assembly 82 disposed on the cylindrical outer surface 116 of the second end portion 112 of the rotor shaft 76. To accomplish this, one end of the pulley assembly 82 abuts the shoulder 126 of the rotor shaft 76 and a retaining ring 140 disposed in the groove 124 abuts the opposite second end of the pulley assembly 82. The rotor shaft 76 is secured to the pulley assembly 82 by a suitable means for rotation therewith. For the vehicle power steering system 10, the rotor shaft 76 includes a female keyway 142 which receives a male key 144 of the pulley assembly 82 in order to key the rotor shaft 76 to the pulley assembly 82 for rotation therewith. Alternatively, other methods can be used to secure the rotor shaft 76 to the pulley assembly 82.

For the vehicle power steering system 10, the insulator 74 is disposed between selected adjacent surfaces of the ball nut 72 and the rotor shaft 76. In particular, the insulator 74 is disposed between the cylindrical outer surface 96 of the first end portion 90 of the ball nut 72 and the cylindrical inner surface 114 of the first end portion 110 of the rotor shaft 76, and between the cylindrical outer surface 96 of the second end portion 92 of the ball nut 72 and the cylindrical inner surface 114 of the second end portion 112 of the rotor shaft 76. Preferably, the insulator 74 is formed from a suitable damping material and is molded in place between the ball nut 72 and the rotor shaft 76 during a molding process so as to fixedly secure the ball nut 72 to the rotor shaft 76 for rotation therewith. A suitable material for the insulator 74 is a rubber material, such as for example, a rubber from the nitrile rubber family. Alternatively, the insulator 74 can be formed from other suitable types of material if so desired.

For the vehicle power steering system 10, the insulator 74 operatively fixes or couples the ball nut 72 to the rotor shaft 76 for rotation therewith. Also, as shown in FIG. 2, a retaining ring 150 is disposed in the groove 122 of the rotor shaft 76. The ring 150 is operative to capture the flange 102 of the ball nut 72 between itself and the shoulder 120 of the rotor shaft 76 to assist in connecting the ball nut 72 and the rotor shaft 76 together. Alternatively, the location and/or the composition of one or more of the ball nut 72, the insulator 74 and/or the rotor shaft 76 can be other than illustrated if so desired.

The ball nut assembly 70 further includes a plurality of force-transmitting members. The force transmitting members comprise balls 160, which are disposed between the internal screw thread convolution 98 of the ball nut 72 and the external screw thread convolution 42 on the screw portion 40 of the steering member 32. The balls 160 are loaded into the ball nut assembly 70 in a known manner. The ball nut assembly 70 further includes a recirculation passage (not shown) for recirculating the balls 160 upon axial movement of the steering member 32 relative to the ball nut assembly 70.

The power source 60 is supported relative to the rack housing 30 by suitable means. The power source 60 includes an output shaft 162 which is connected to a member 164 for rotation therewith. For example, the member 164 may be a timing belt. The timing belt 164 is operatively connected to the pulley assembly 82. Thus, when the power source 60 is actuated, the timing belt 164 is rotated via the output shaft 162 so as to rotate the pulley assembly 82. The rotation of the pulley assembly 82 causes the ball nut assembly 72 to be rotated and thereby produce axial movement of the steering member 32 via the balls 160.

The steering assembly 10 further includes an electronic control unit or controller 180. The controller 180 is preferably secured to the rack housing 30 in a manner not shown. The controller 180 is electrically connected to the power source 60 by electrical lines 182 and is electrically connected by the electrical lines 20 to the torque sensor 16. The controller 180 is operable to receive electrical signals from the torque sensor 16 and to control the power source 60 in accordance with the received electrical signals. When steering torque is applied to the vehicle steering wheel 12, the input shaft 14 rotates about the axis X1. The direction and magnitude of the applied steering torque are sensed by the torque sensor 16. The torque sensor 16 outputs an electrical signal to the controller 180. The power source 60 is activated by a control signal transmitted to the power source 60 by the controller 180, and the output shaft 162 of the power source 60 is caused to rotate about a power source axis X3.

The rotating motor shaft 162 rotates the pulley assembly 82 via the belt 164 which in turn transmits the drive force of the power source 60 to the ball nut 72 of the ball nut assembly 70. The rotation of the ball nut 72 results in linear movement of the steering member 32. The balls 160 transmit the rotation force of the ball nut 72 to the rack portion 34 of the steering member 32. Because the ball nut 72 is fixed in position axially, the steering member 32 is driven to move axially in response to rotation of the ball nut 72 to effect steering movement of the steerable wheels of the vehicle. The power source 60 thus provides steering assist in response to the applied steering torque.

Figure 3:
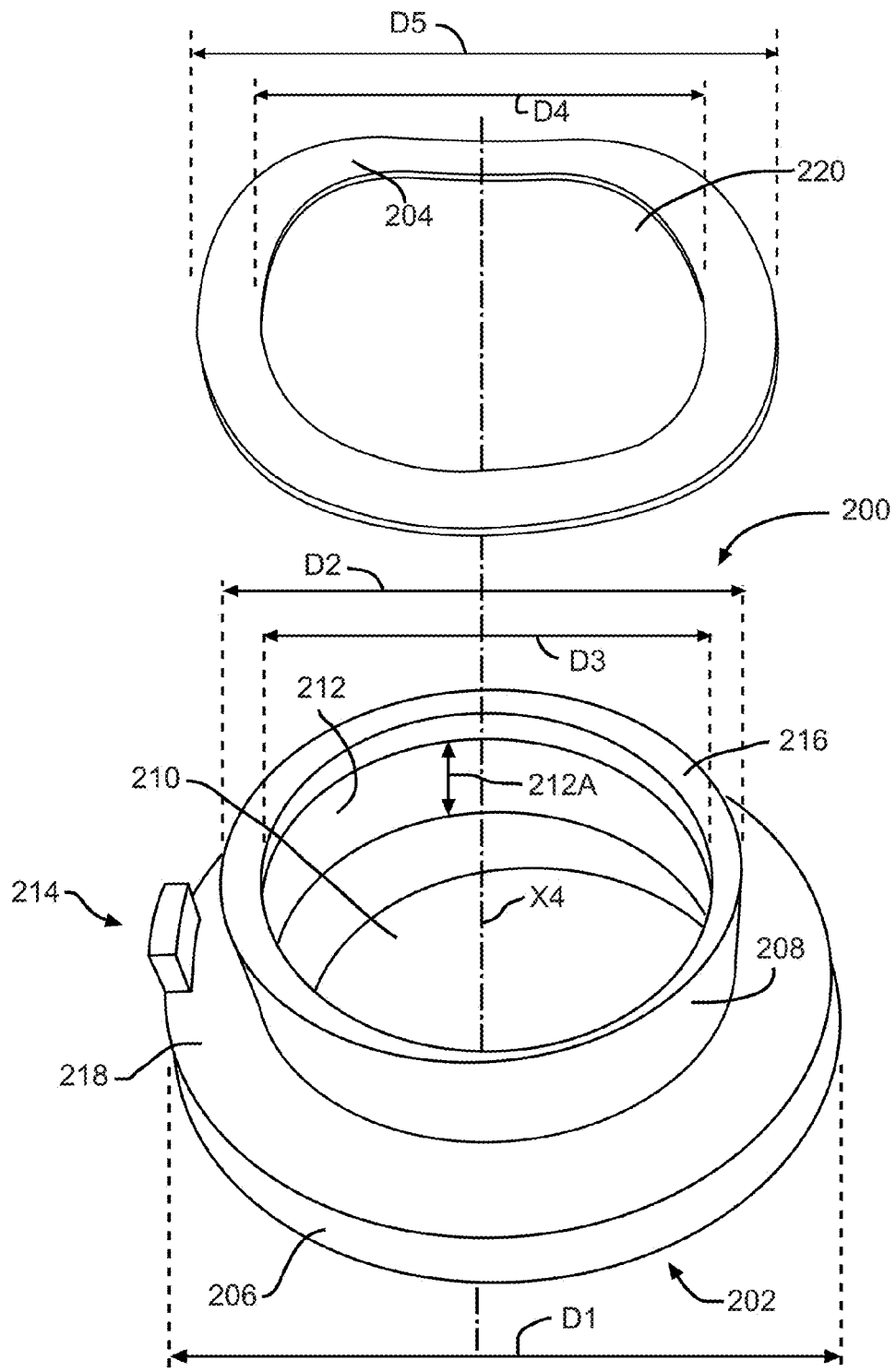
FIG. 3 is an exploded perspective view of a first embodiment of an anti-lash assembly in accordance with the present invention.

Referring now to FIG. 3, there is illustrated an embodiment of an anti-lash assembly, indicated generally at 200, produced in accordance with the present invention. It should be noted that while this invention will be described and illustrated in conjunction with the particular prior art power steering assembly 10 disclosed herein, it will be appreciated that the anti-lash assembly 200 may be used in conjunction with other types or kinds of vehicle power steering systems.

In the illustrated embodiment, the anti-lash assembly 200 includes a first member, indicated generally at 202, and a second member 204. As will be discussed below, the second member 204 may be omitted. The first member 202 is preferably configured as a bushing 202 and is preferably fabricated from a plastic material such as, for example, polytetrafluoroethylene (e.g., Teflon) or nylon. The bushing 202 includes a first portion 206 and an optional second portion 208. The first portion 206 is configured as a base portion and the second portion 208 is configured as a collar and extends upwardly or outwardly from the base portion 206.

The base and collar portions 206 and 208, respectively, are illustrated as annular and the base portion 206 defines a first outer diameter D1 which is greater than a second outer diameter D2 of the collar portion 208. Both the base and collar portions 206 and 208, respectively, have an inner diameter D3. Alternatively, the first and second outside diameters D1 and D2, respectively, may be other than illustrated. For example, the first and second outside diameters D1 and D2, respectively, may be equal if so desired. Also, the base and collar portions 206 and 208, respectively, may be other than annular. The construction, shape, configuration, and/or make-up of the bushing 202 may be other than illustrated and described, if so desired. For example, the base portion 206 or collar portion 208 may have a rectilinear exterior shape.

In the illustrated embodiment, the bushing 202 has an opening 210 through the base and collar portions 206 and 208, respectively. The opening 210 defines a bushing centerline X4. The opening 210 has an internal bushing screw thread convolution 212 with a second lead spacing 212A—i.e., a distance along the bushing centerline X4 covered by one complete rotation of the internal bushing screw thread convolution 212. For a purpose to be discussed below, there is a lead spacing difference between the first lead spacing 42A of the external screw thread convolution 42 on the screw portion 40 and the second lead spacing 212A on the bushing 202. The lead spacing difference may be produced by the second lead spacing 212A being greater or less than the first lead spacing 42A. Additionally, the opening 210 is sized such that the bushing 202 may be screwed onto the screw portion 40 of the steering member 32.

In the illustrated embodiment, the collar portion 208 is preferably provided on the bushing 202 to provide an increased contact area between the bushing 202 and the screw portion 40 and/or an increased screw thread engagement between the bushing screw thread convolution 212 and the external screw thread convolution 42. Depending upon design characteristics, when an increased contact area and/or screw thread engagement is not needed, the collar portion 208 may be omitted. The collar portion 208 defines an end face or surface 216.

In the illustrated embodiment, the bushing 202 includes a "retention" or third member, indicated generally at 214, for a purpose to be discussed below. As illustrated, the third member 214 is configured as a protruding leg or lug which extends from an end face 218 of the base portion 206. Alternatively, the third member 214 may extend from the collar portion 208. As illustrated, the third member 214 is generally parallel to the centerline X4. Alternatively, the third member 214 may be other than generally parallel to the center line X4.

In the illustrated embodiment, the second member 204 is preferably configured as a spring and more preferably as a wave spring. Alternatively, the spring 204 may be of other suitable types known to those skilled in the art. The spring 204 has an opening 220 about the centerline X4, an inner diameter D4, and an outer diameter D5. The inner diameter D4 is greater than the outer diameter D2 such that the spring 204 fits over the collar portion 208. The outer diameter D5 is less than the outer diameter D1 such that the spring 204 seats against the base portion 206. When assembled, the spring 204 is operatively disposed between the bushing 202 and the ball nut 72 when the bushing 202 is screwed onto the screw portion 40. The construction, shape, configuration, and/or makeup of the second member 204 may be other than illustrated and described, if so desired. For example, the spring 204 may be a coil spring or the spring 204 may be used with the base portion 206 having the collar portion 208 omitted.

Figure 4:
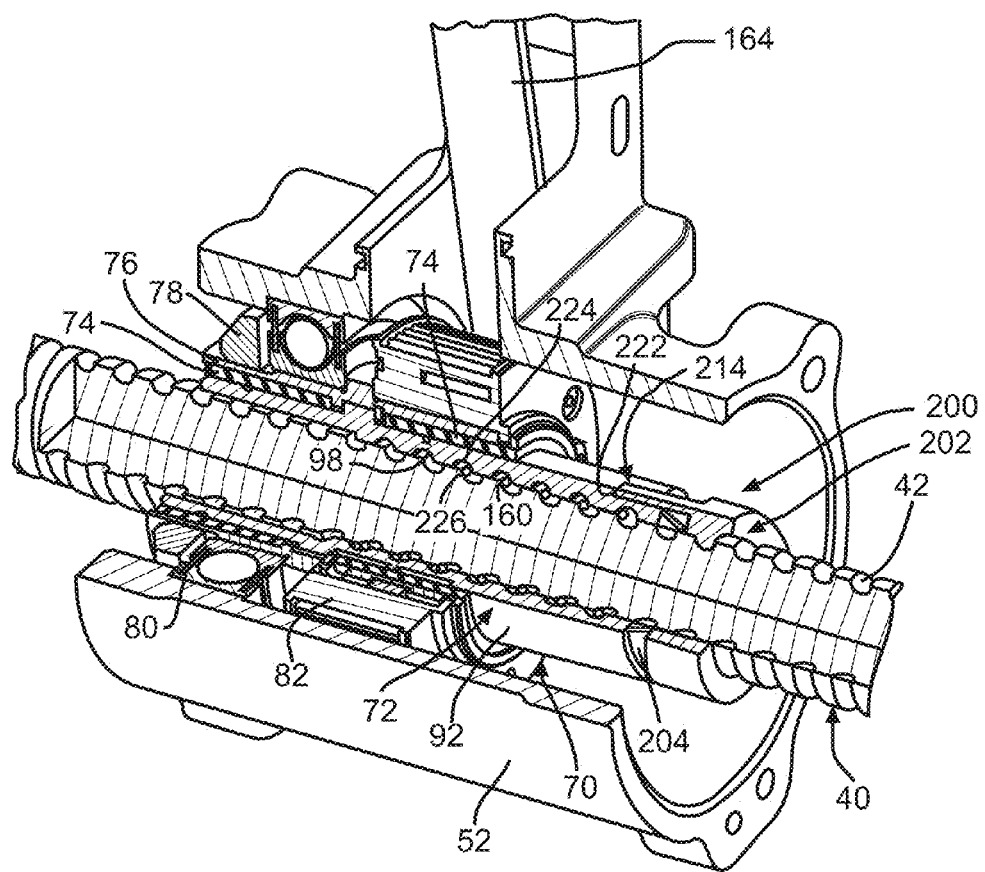
FIG. 4 is a partial sectional view of a vehicle power steering assembly having the first embodiment of the anti-lash assembly illustrated in FIG. 3.

Referring now to FIG. 4, there is illustrated the anti-lash assembly 200 installed on the screw portion 40 of the steering member 32. The bushing 202 is illustrated without the collar portion 208. As shown in FIG. 4, the spring 204 is operatively compressed between the bushing 202 and the ball nut 72.

To accomplish this, the ball nut 72 is installed on the screw portion 40 using a suitable means known to those skilled in the art. The spring 204 is then placed around the screw portion 40. The bushing 202 is then threaded onto the screw portion 40. Screwing the bushing 202 along the screw portion 40 and towards the ball nut 72 operatively compresses the spring 204 between the bushing 202 and the ball nut 72. The bushing 202 is screwed against the second end portion 92 such that the third member 214 enters a notch 222 in the second end portion 92. The third member entering into the notch 222 rotationally restrains the bushing 202 about the rack axis X2. Typically, the end face 218 of the bushing 202 is substantially parallel to the second end portion 92.

The lead spacing difference creates a friction fit between the bushing screw thread convolution 212 and the external screw thread convolution 42. The friction fit restrains the bushing 202 laterally in the direction of the rack axis X2. The friction fit is sufficient to restrain the bushing 202 laterally on the screw portion 40 during typical or routine operation of the power steering assembly 10.

Once the bushing 202 is screwed against the second end portion 92, the friction fit restrains the bushing 202 such that a preload is created on the ball nut 72 of the ball nut assembly 70. The preload biases the ball nut 72 away from the bushing 202 and reduces or minimizes any lash between the screw portion 40, ball nut 72, and balls 160. In addition to biasing the ball nut 72 away from the bushing 202, the preload also biases a trailing surface 224 of the internal screw thread convolution 98 against the balls 160 and the balls 160 against a leading surface 226 of the external screw thread convolution 42.

As is readily understood by one skilled in the art, the preload provided by the bushing 202 being screwed against the second end portion 92 increases as the bushing 202 is screwed further onto the screw portion 40 and toward the ball nut 72. As such, the preload amount may be controlled or adjusted by varying how far the bushing 202 is screwed toward the second end portion 92. As the preload increases, any such lash between the screw portion 40, ball nut 72, and balls 160 is progressively reduced. However, as the preload increases, friction between the screw portion 40, ball nut 72, and balls 160 increase as well. A plurality of notches 222 may be provided circumferentially about the second end portion 92 of the ball nut 72. The plurality of notches 222 permit the bushing 202 to be installed at different preload amounts to "tune" lash reduction and increased friction.

During operation of the vehicle power steering assembly 10, the screw portion 40 rotates through the opening 210 and the external screw thread convolution 42 rotates through the bushing screw thread convolution 212 (the bushing 202 being rotationally restrained by the third member 214). Because of the lead spacing difference, the screw portion 40 will wear on and loosen the bushing screw thread convolution 212. For example, wear on the bushing screw thread convolution 212 will occur when the rack member 32 is metal and the bushing 202 is fabricated from plastic. The "compressed" spring 204 will take up wear between the bushing 202 and the screw portion 40 by pushing the bushing screw thread convolution 212 away from the ball nut 72 and against the external screw thread convolution 42. Alternatively, in applications where wear on the bushing 202 is acceptable, is not present, or is minimal, the spring 204 may be omitted from the installed anti-lash assembly 200 if so desired.

As illustrated, the anti-lash assembly 200 is installed and tightened on the screw portion 40 away from the end 54A and towards the end 50A such that the anti-lash assembly 200 contacts the second end portion 92 and the ball nut 72 is biased away from the end 54A and towards the end 50A. As one skilled in the art will readily understand, the anti-lash assembly 200 may also be installed and tightened on the screw portion 40 away from the end 50A and towards the end 54A such that the power steering anti-lash assembly 200 contacts the first end portion 90 and the ball nut 72 is biased away from the end 50A and towards the end 54A. That is, the anti-lash assembly 200 may be installed and tightened against either the first or second end portion 90 or 92, respectively, of the ball nut 72.

Figure 5:
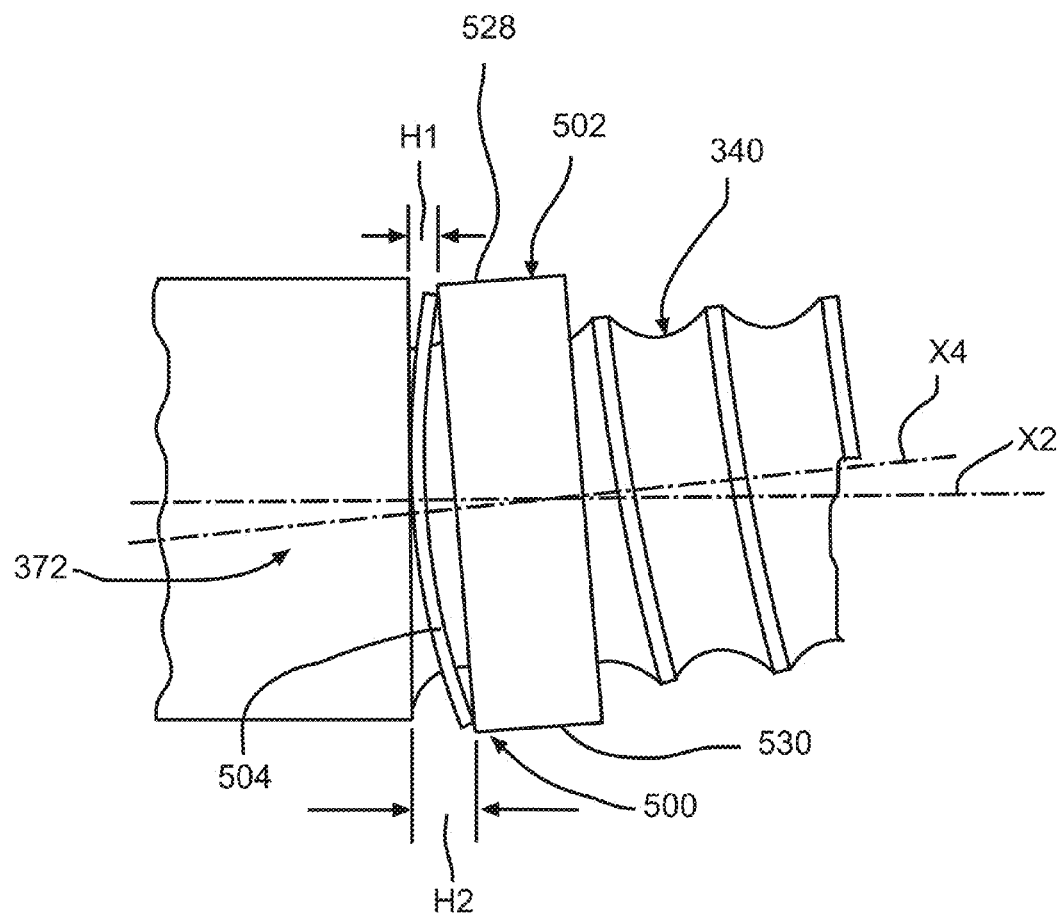
FIG. 5 is a partial elevation view of a vehicle power steering assembly having a second embodiment of an anti-lash assembly in accordance with the present invention.

Referring now to FIG. 5, there is illustrated a second embodiment of an anti-lash assembly, indicated generally at 500, produced in accordance with the present invention. Because the anti-lash assembly 500 is a variation of the anti-lash assembly 200 of FIGS. 3 and 4, like reference numerals, increased by 300, designate corresponding parts in the drawings and detailed description thereof will be omitted.

As shown in FIG. 5, using a suitable method known to those skilled in the art, the spring 504 may be fabricated to produce a moment about an axis perpendicular to the rack axis X2. For example, as illustrated, the spring 504 may be asymmetrical about the rack axis X2. The moment is produced as the bushing 502 is tightened and the spring 504 is compressed. The moment rotates the bushing 502 such that a first gap H1 on a first side 528 of the bushing 502 is less than a second gap H2 on a second side 530 of the bushing 502, the second side 530 being opposite the first side 528. The first gap H1 being less than the second gap H2 increases the preload created by the bushing 502 on the ball nut 372 alone. The moment rotating the bushing 502 may be used for the anti-lash assembly 500 with or without the bushing 502 contacting the ball nut 372—i.e., the preload may be created by the moment only.

Figure 6:
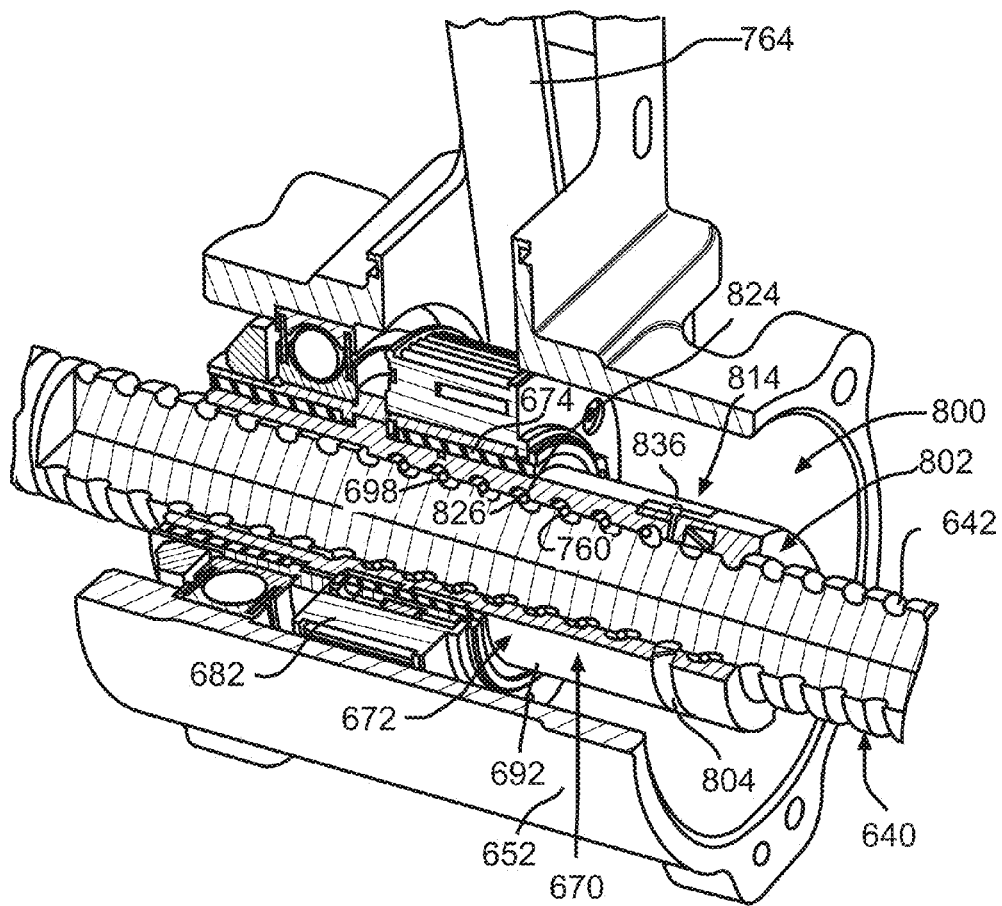
FIG. 6 is a partial sectional view of a vehicle power steering assembly having a third embodiment of an anti-lash assembly in accordance with the present invention.

Referring now to FIG. 6, there is illustrated a third embodiment of a power steering anti-lash assembly, indicated generally at 800, produced in accordance with the present invention. Because the anti-lash assembly 800 is a variation of the anti-lash assembly 200 of FIGS. 3 and 4, like reference numerals, increased by 600, designate corresponding parts in the drawings and detailed description thereof will be omitted.

As shown in FIG. 6, the anti-lash assembly 800 has an alternative fastener 814 comprising a pin 836 between the bushing 802 and the ball nut 672. The pin 836 is conventional in the art and restrains the bushing 802 from rotating about the rack axis X2. For example, the pin 836 may have an enlarged head and be restrained by a cotter pin.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle power steering assembly comprising:
    a steering member having a screw portion, wherein the screw portion has an external screw thread convolution with a first lead spacing;
    a ball nut operatively connected to the screw portion; and
    a bushing operatively connected to the screw portion, wherein the bushing has a bushing screw thread convolution with a second lead spacing different than the first lead spacing and the bushing biases the ball nut against the screw portion.

2. The vehicle power steering assembly of claim 1 further comprising:
    a rack axis, wherein the external screw thread convolution and the bushing screw thread convolution are along the rack axis and the second lead spacing being different than the first lead spacing restrains the bushing laterally along the rack axis.

3. The vehicle power steering assembly of claim 1 wherein the bushing contacts the ball nut.

4. The vehicle power steering assembly of claim 1 further comprising:
    a spring disposed between the ball nut and bushing.

5. The vehicle power steering assembly of claim 4 wherein the spring biases the bushing against the screw portion.

6. The vehicle power steering assembly of claim 4 wherein the spring produces first and second gaps between an end face of the ball nut and the bushing, and wherein the second gap is opposite and larger than the first gap.

7. The vehicle power steering assembly of claim 1 further comprising:
    a first gap between an end face of the ball nut and the bushing; and
    a second gap between the end face and the bushing, wherein the second gap is opposite and larger than the first gap.

8. The vehicle power steering assembly of claim 1 further comprising:
    a notch on the ball nut; and
    a member extending from the bushing, wherein the member enters the notch to rotationally restrain the bushing on the screw portion.

9. The vehicle power steering assembly of claim 1 further comprising:
    a pin connecting the ball nut and the bushing, wherein the pin rotationally restrains the bushing on the screw portion.

10. A method of biasing a vehicle power steering assembly comprising the step of:
    operatively connecting a ball nut to a screw portion of a steering member, wherein the screw portion has an external screw thread convolution with a first lead spacing;
    operatively connecting a bushing to the screw portion, wherein the bushing has a bushing screw thread convolution with a second lead spacing different than the first lead spacing; and
    tightening the bushing against the ball nut to bias the ball nut against the screw portion.

11. The method of claim 10 comprising the further step of:
    compressing a spring between the ball nut and the bushing.

12. The method of claim 11 wherein the spring produces first and second gaps between an end face of the ball nut and the bushing, wherein the second gap is opposite and larger than the first gap.

* * * * *